Dec. 1, 1936.   G. LEISCHNER   2,062,719
REGULATING TRANSFORMER
Filed July 9, 1935   11 Sheets-Sheet 1

Georg Leischner,
Inventor

By Bailey & Carson
Attorneys

Dec. 1, 1936.  G. LEISCHNER  2,062,719
REGULATING TRANSFORMER
Filed July 9, 1935   11 Sheets-Sheet 2

Georg Leischner,
Inventor
By Bailey & Carson
Attorneys

Dec. 1, 1936.   G. LEISCHNER   2,062,719
REGULATING TRANSFORMER
Filed July 9, 1935   11 Sheets-Sheet 3

Georg Leischner,
Inventor
By Bailey & Carson
Attorneys

Dec. 1, 1936.                G. LEISCHNER                2,062,719
                       REGULATING TRANSFORMER
                       Filed July 9, 1935            11 Sheets-Sheet 4

Georg Leischner,
            Inventor
By
            Attorneys

Fig. 7

Dec. 1, 1936.  G. LEISCHNER  2,062,719
REGULATING TRANSFORMER
Filed July 9, 1935  11 Sheets-Sheet 7

Georg Leischner,
Inventor
By Bailey L Carson
Attorneys

Dec. 1, 1936.  G. LEISCHNER  2,062,719
REGULATING TRANSFORMER
Filed July 9, 1935  11 Sheets-Sheet 8

Georg Leischner,
Inventor
Bailey & Parson
Attorneys

Dec. 1, 1936.  G. LEISCHNER  2,062,719
REGULATING TRANSFORMER
Filed July 9, 1935   11 Sheets-Sheet 9

Georg Leischner,
Inventor
By Bailey & Carson
Attorneys

Dec. 1, 1936. G. LEISCHNER 2,062,719
REGULATING TRANSFORMER
Filed July 9, 1935 11 Sheets-Sheet 10

Georg Leischner,
Inventor

By Bailey Pearson
Attorneys

Dec. 1, 1936.  G. LEISCHNER  2,062,719
REGULATING TRANSFORMER
Filed July 9, 1935  11 Sheets-Sheet 11

Georg Leischner,
Inventor
By Bailey & Carson
Attorneys

Patented Dec. 1, 1936

2,062,719

UNITED STATES PATENT OFFICE 2,062,719

REGULATING TRANSFORMER

Georg Leischner, Berlin-Schmockwitz, Germany, assignor to N. V. Machinerieen-en Apparaten Fabrieken "Meaf", Utrecht, Netherlands Application July 9, 1935, Serial No. 30,569
In Germany July 24, 1934

17 Claims. (Cl. 171—119)

The invention relates to regulator-transformers. One use of such transformers consists, for example, in maintaining the potential of an alternating current net constant despite varying loads or fluctuations in the feed potential. Another use is that of conversion of a constant auxiliary potential into a variable potential for supplying current to the motors of electric locomotives.

For the regulation of alternating fluxes, generally transformers are used in which one coil is provided with taps or leads which are connected to contacts, so that different lengths of this coil can be connected in. In passing from one contact to the next, the electric current must ordinarily be interrupted for a short period of time. If such interruption is to be avoided, the connection must be established with the next succeeding contact before that with the preceding one is broken, which then short-circuits the part of the coil between the two contacts. Powerful short-circuit currents are thereby produced in this part of the coil, which cause dangerous heating of the coil, and the interruption of which produces injurious arc.

The present invention relates to a regulating transformer in which these defects are avoided, by forming the iron core of a plurality of partial cores or limbs and connecting the regulator coil with the tap contacts in such a manner that when two adjacent contacts and the coil section between them, are short-circuited the shorted portion of the circuit encompasses only one partial core or limb, and the flux which would otherwise pass through this partial core or limb is forced off to the other partial cores or limbs.

Further advantages of the invention will appear more fully from the following description, particularly when taken in conjunction with the accompanying drawings, which form a part thereof.

Figure 1:
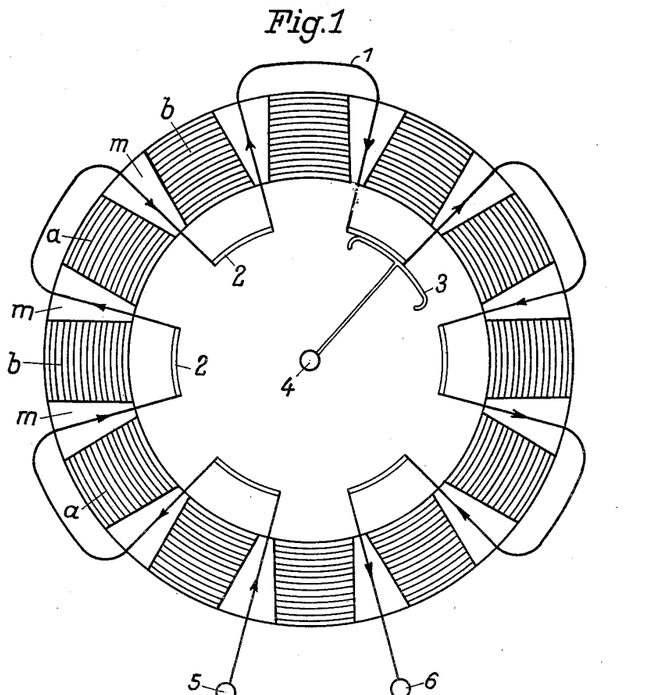
Fig. 1 is a diagrammatic plan view of a simple construction of regulating transformer embodying my invention.
Figure 1A:
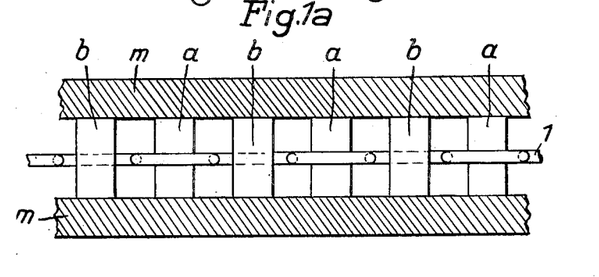
Fig. 1a is a diagrammatic side elevation of a portion of the same.

In the regulating transformer shown in Figs. 1 and 1a the iron core consists of two annular yokes $m$ and the partial cores, or limbs, connecting these two yokes, said partial cores or limbs being designated $a$, $b$. The regulator coil 1 is passed between the partial cores so that it encompasses all the partial cores $a$, while the partial cores $b$ lie outside the coil. These partial cores outside of the regulator coil are termed hereinafter "magnetic flux return conductors", that is, they serve to complete a magnetic flux circuit through the partial cores $a$ and yokes $m$. The parts 2 of the regulator coil form the contacts of a contact path or group on which slides a movable contact 3, rotatable about the point 4. On passage of the brush 3 from any one contact to the next there will be a short-circuiting of that part of the regulator coil lying between the two contacts since the movable contact 3 is wider than the space between contacts 2, so that it will engage one contact before leaving the preceding one. This arrangement prevents any complete opening of the circuit during the switching operation. The short circuit current flowing in this short-circuited coil section causes a flux in the encompassed partial core or limb, which is opposed to the main flux. The flux flowing through this partial core or limb is thus diminished, while at the same time the flux passing through the remaining partial cores is correspondingly increased. The flux is thus, to a certain extent, forced off to the other partial cores or limbs, and the short circuit current passing in the short-circuited part of the coil must then remain within the order of magnitude of the magnetizing current.

The transformer described may also be used as an auto-transformer, if the primary voltage is applied at the terminals 5 and 6 while the regulated voltage, or secondary current, is taken off between one of the contacts 5 and 6 and the axis 4 of the movable contact.

In addition to the regulator coil, there may be a separate primary coil, which may pass between the partial cores in the same manner as the regulator coil, if necessary with a larger number of windings; or single coils may be arranged on the partial cores, each of which encompasses several either of the partial cores or of the magnetic return conductors, in which case the coils are preferably connected in parallel; or each primary coil may encompass only one partial core, the coils then being connected in series.

Figure 2:
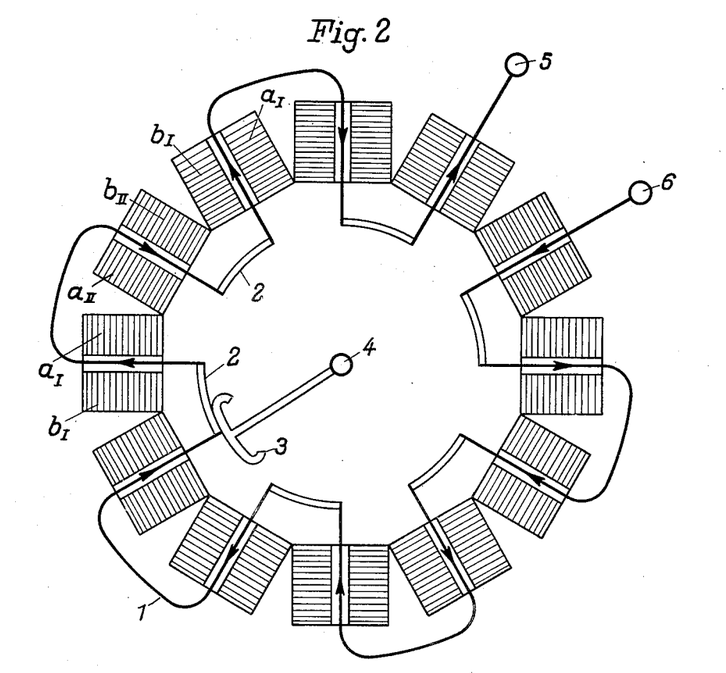
Fig. 2 is a diagrammatic plan view of a modified form.
Figure 2A:
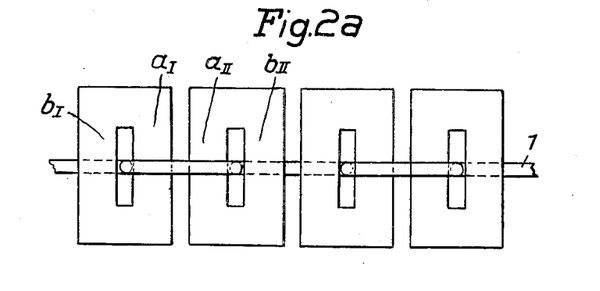
Fig. 2a is a diagrammatic side elevation of a portion of the same.

Figs. 2 and 2a show a regulating transformer similar in operation, but with a different type of iron core. This form embodies a plurality of partial cores $a$, each consisting of two limbs $a_I$ and $a_{II}$, each of which is magnetically closed by a magnetic flux return conductor $b_I$ or $b_{II}$. The individual limbs are, however, magnetically separated from one another. The regulator coil and contacts are arranged in the same manner as in Fig. 1.

In case the transformer is not to be used as an auto-transformer, but is to be provided with a primary coil separate from the regulator coil, this coil may be arranged as described for Fig. 1; or it may consist of a plurality of coils connected in parallel, each encompassing two magnetic flux return conductors $b_I$ and $b_{II}$ associated with different partial cores.

Figure 3:
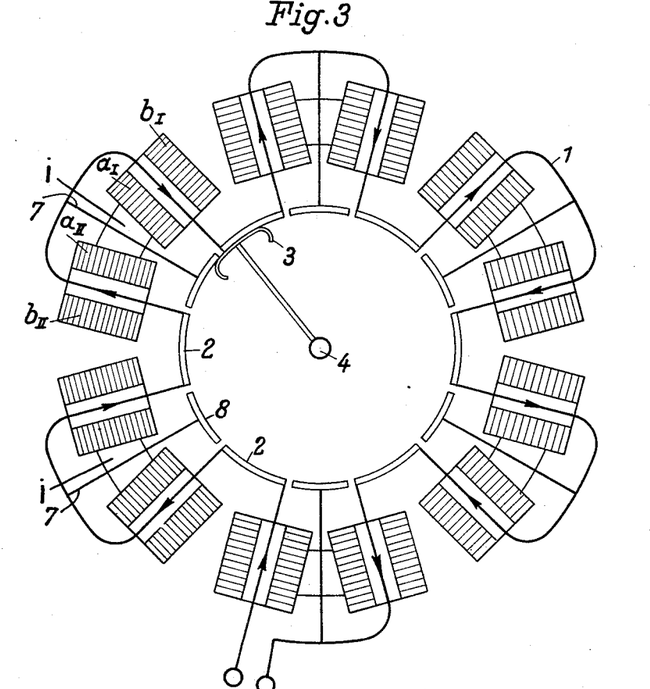
Fig. 3 is a diagrammatic plan view of a further modification.
Figure 3A:
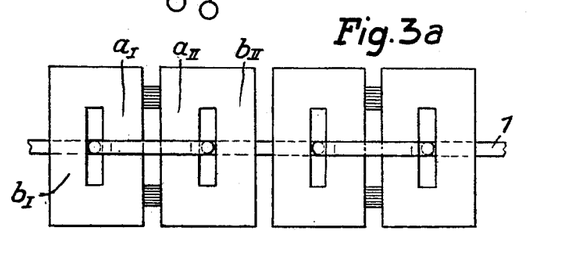
Fig. 3a is a diagrammatic side elevation of a portion of the same.

Figs. 3 and 3a show a regulating transformer which is an improvement on that of Fig. 2. In order to subdivide the regulation stages with still greater precision, the regulator coil is provided with taps 7 which pass between the limbs $a_I$ and $a_{II}$ of each partial core to the contacts 8 of the contact path or group. When two adjacent contacts are short-circuited, only one limb of a partial core is encompassed by the short circuit current, and the flux is forced from this limb to the other limbs magnetically connected therewith. In order to facilitate this forcing off of the flux, there may be disposed, between the limbs of a partial core, magnetically conducting connections, for example in the form of iron wedges $i$. These iron wedges are, however, not absolutely indispensable, and they may be omitted particularly when the primary coil consists of individual coils connected in parallel, each of which encompasses the limbs $a_I$ and $a_{II}$ of a partial core.

Figure 4:
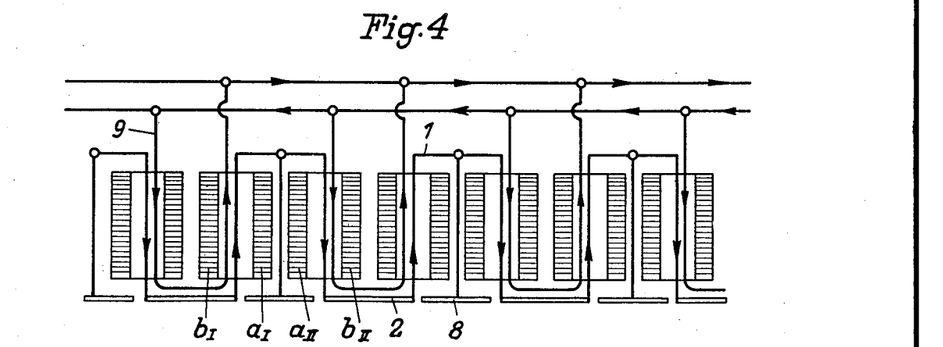
Figs. 4 and 5 are diagrammatic views showing two possible arrangements of the primary and secondary coils on the partial cores.

Figs. 4 and 5 show the arrangement of the primary and secondary coils diagrammatically. According to Fig. 4 each of the primary coils 9, which are connected in parallel, encompasses the magnetic flux return conductors of limbs associated with different partial cores. Upon the short-circuiting of two adjacent contacts of the secondary coil by the movable contact, the flux in the limb encompassed by the short-circuited coil is suppressed, whereby the flux in the limb of the adjacent core section the magnetic flux return conductor of which is encompassed by the same primary coil is correspondingly increased. This action on adjacent core sections, which is often undesirable, is avoided with the arrangement of primary coils shown in Fig. 8 and the following figures.

Figure 5:
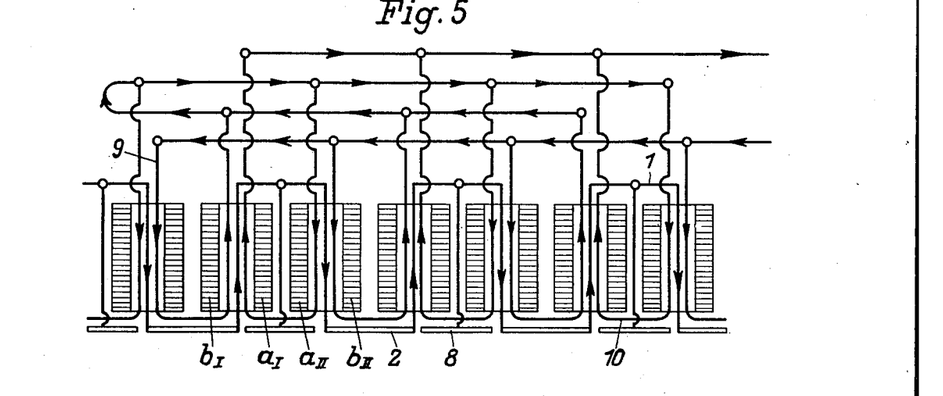

Fig. 5 shows a primary coil arrangement in which the limbs of a partial core as well as the return conductors of the limbs of different partial cores are encompassed by primary coils. The primary coils 10 which encompass the limbs $a_I$ and $a_{II}$ are connected together in parallel, as are also the coils 9 which encompass the return conductors $b_I$ and $b_{II}$, and the two coil groups are connected together in series.

A still finer degree of regulation may be obtained if taps are provided not only between the limbs but also between the return conductors.

Figures 6, 6A:
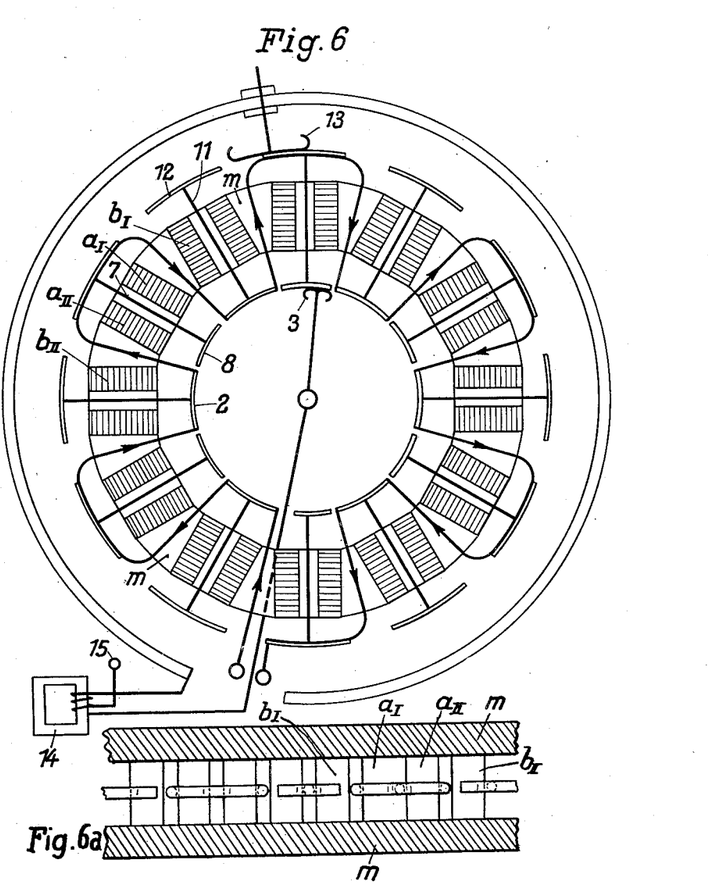
Figs. 6, 7, and 8 are diagrammatic plan views of further embodiments.
Fig. 6a is a diagrammatic side elevation of the device shown in Fig. 6.

Figs. 6 and 6a show an arrangement of this type. The iron core, as in the regulating transformer of Fig. 1, consists of two annular yokes $m$ and the partial cores $a$ and the return conductors $b$ connecting them. Each partial core consists of two limbs $a_I$ and $a_{II}$; each return conductor of two limbs $b_I$ and $b_{II}$. As in Fig. 3, the taps 7 are connected to the contacts 8 of a contact group; and in addition there are provided taps 11 which pass through or between the limbs of the return conductors and are connected to the contacts 12 of a second contact group. The movable contacts 3 and 13 slide on these two contact groups. The leads to the two movable contacts 3 and 13 are connected with the ends of the winding of an inductive potential balancer 14, at the centre of which the regulated potential is taken off at 15.

Figure 7:
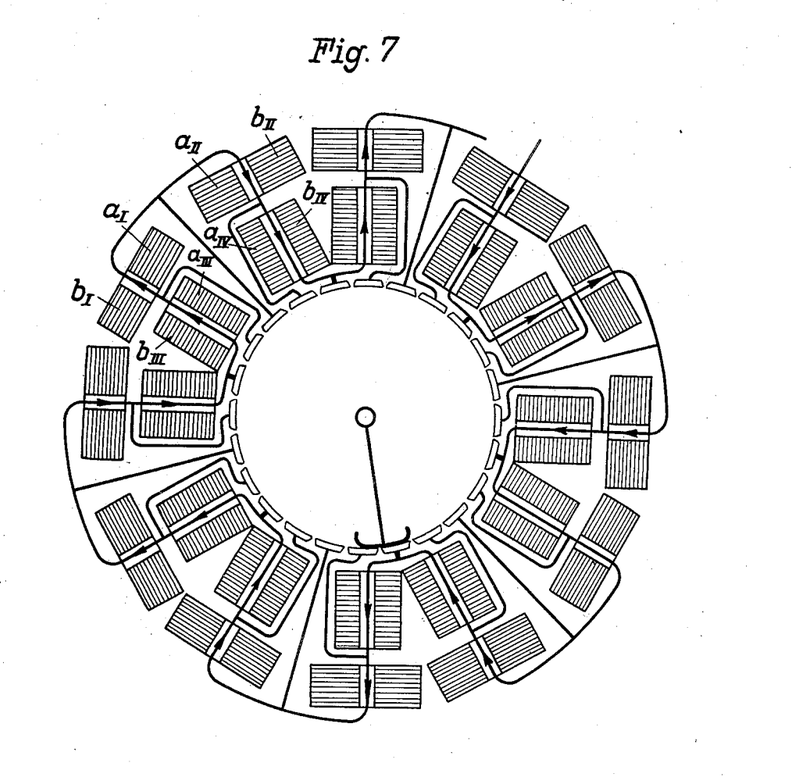

A finer subdivision may also be obtained without the use of two contact groups, by subdividing each partial core, not merely into two, but into a larger number of limbs. Fig. 7 shows a regulating transformer diagrammatically in which each partial core is subdivided into four limbs $a_I$, $a_{II}$, $a_{III}$, and $a_{IV}$; magnetic flux return conductors are associated therewith. If a partial core consists of $n$ limbs, then $(n-1)$ taps can be arranged on the part of the regulator coil which encompasses this partial core, and these taps must be connected to the contact group in such a manner that each two adjacent taps together with the part of the regulator coil between them encompass the cross section of one limb.

Figure 8:
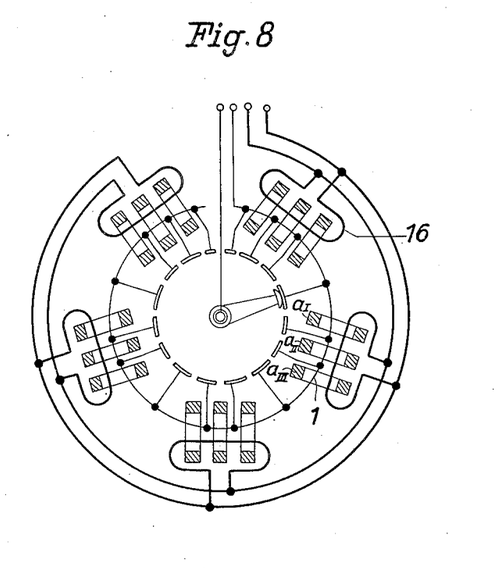

Fig. 8 shows a regulating transformer the partial cores of which are each subdivided into three limbs $a_I$, $a_{II}$, and $a_{III}$, and their respective return conductors. The individual windings 16 of the primary coil each encompass three of the return conductors corresponding to the same partial core.

The operation of the regulating transformers is best explained by considering the transformer as consisting of a large number of individual transformers. These individual transformers are arranged in groups. Each limb $a_I$, respectively $a_{II}$, etc., and the corresponding return conductors $b_I$, respectively $b_{II}$, etc., together form the core of such an individual transformer. Each core section is preferably a group of at least two such individual transformers. The procedure in a core section of a regulating transformer considered as such a group is explained with reference to Figs. 9–13.

Figure 9:
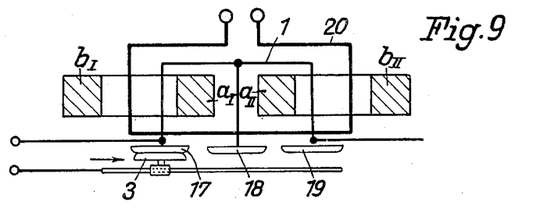
Figs. 9 to 13 are diagrammatic views of an individual core section and the corresponding coils, at various stages during the movement of the movable contacts.
Figure 10:
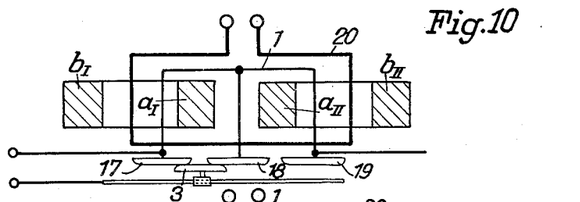

The two limbs of the partial core are designated by $a_I$ and $a_{II}$, as in the preceding figures, particularly Fig. 3, the magnetic return conductors by $b_I$ and $b_{II}$. Fig. 9 shows the regulator coil 1 without current and open. Only a slight magnetizing current flows in primary coil 20. If contact 3 moves further in the direction of the arrow the position shown in Fig. 10 is next attained. The stationary contacts 17 and 18 are now bridged by the movable contact 3. The short circuit current in the part of the regulator coil encompassing the limb $a_I$ is limited, as the flux generated by primary coil 20 is forced from the limb $a_I$ to the limb $a_{II}$. As a result the primary coil is traversed only by the magnetizing current necessary for generating the flux in the limb $a_{II}$, and the short circuited coil encompassing the limb $a_I$ is traversed by a short circuit current corresponding to this primary current.

Figure 11:
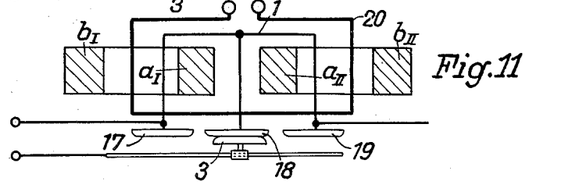

If contact 3 moves further the short circuit between contacts 17, 18 is broken, resulting in the case of Fig. 11. Injurious phenomena do not arise when the short circuit is broken, as only a negligibly small load is cut out.

In the position of Fig. 11, the part of the regulator coil encompassing the limb $a_I$ is traversed by operating current; the limb $a_{II}$ in such a case would normally act to choke the primary current and, through the magnetic coupling of the two currents, the secondary current also. This undesirable action is prevented by the fact that the limb $a_{II}$ is highly supersaturated by the primary current. The limb $a_I$ now forms, to a certain degree, with the current-traversed part of the secondary coil and the primary coil, a normal transformer, to which a choke formed by primary coil 20 and the limb $a_{II}$ is connected in series on the primary side. This choke, being highly supersaturated only by the primary current, is practically almost inactive.

The undesired reaction on the secondary potential generated caused by this supersaturation is very slight in each core section or group. When use is made of a large number of core sections, it is insignificant with relation to the total potential generated, as it remains limited to the individual core sections.

If the regulating transformer consists of only a relatively small number of core sections or groups, or if more stringent requirements are placed on the potential generated, it is advantageous to provide each individual limb with an air gap, so dimensioned that the flux generated by the operating current is small as compared with the flux generated by the primary coil.

If necessary, a condenser 24 (Fig. 14) can be advantageously connected across the leads of the secondary circuit in order to prevent damage by vibrations of the potential arising as a result of the supersaturation, and a resistance 25 (Fig. 14) may be similarly arranged in order to suppress the occurrence oscillations.

Figure 12:
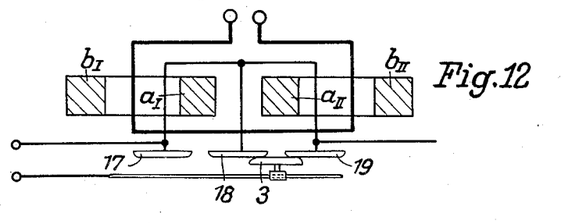

On further movement of contact 3, contacts 18 and 19 are conductively connected as shown in Fig. 12. In this case the conditions are much the same as in the case of Fig. 10. The coil section encompassing the limb $a_{II}$ is short-circuited, but the short circuit current is limited because the flux generated by the primary coil is forced off to the limb $a_I$. On breaking the short circuit, therefore, there is in this case also only a small load to be cut out, and injurious phenomena do not arise.

Figure 13:
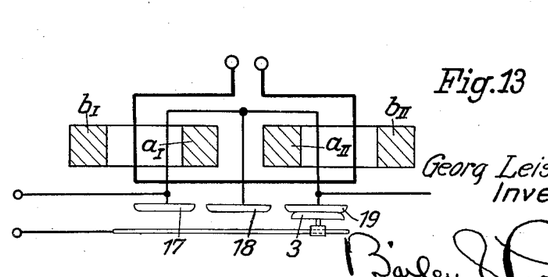

Fig. 13 shows the final position. The entire winding of the secondary coil is traversed by the operating current. Connected with contact 19 is the first contact of the next, similar, core section, so that the same procedure is repeated on further movement of contact 3 in the same direction.

Figure 14:
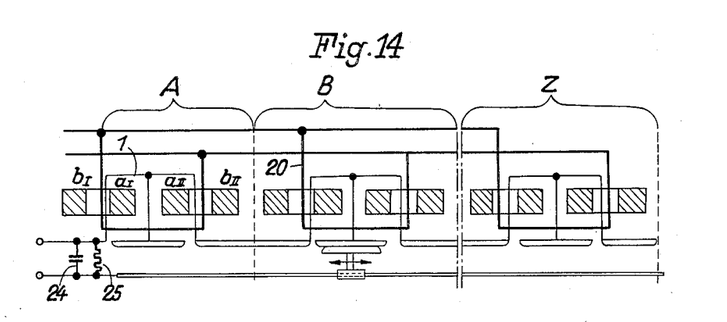
Fig. 14 shows diagrammatically several core sections and the electric connections between their coils.

Fig. 14 shows diagrammatically an arrangement comprising a plurality of such groups or core sections, similar to that of Figs. 9 to 13, which can also be arranged differently from the annular arrangement shown in Figs. 1 to 8, that is, side by side in a row or line.

In order to avoid the necessity of forming the transformer of a large number of core sections or groups of individual transformers, it is preferable to have the secondary coil pass several times through the whole series of core sections or through each individual core section. In the embodiment of Fig. 11, several parallel contact paths, successively traversed by movable contacts, would be necessary in the first case. It is therefore generally preferable to dispose the partial poles annularly, as described.

Figure 15:
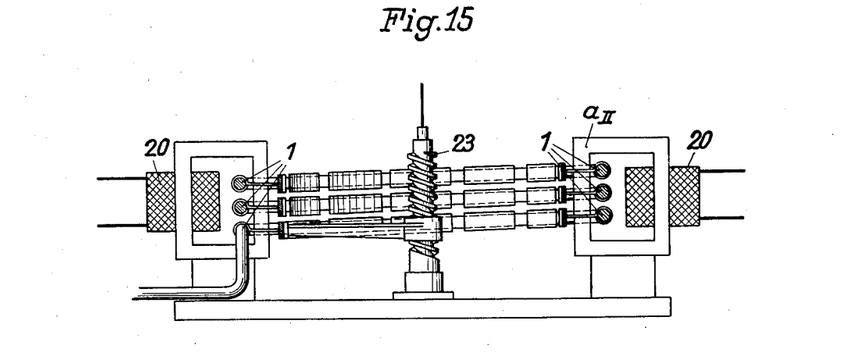
Fig. 15 is a cross section of a device similar to that shown in Fig. 8.

The regulator coil may then, as shown in Fig. 15, be passed spirally through the annularly arranged partial cores and the contact groups likewise arranged helically at the interior of the annulus. A threaded spindle 23, the pitch of which corresponds to that of the windings, serves for guiding the movable contact. The movable contact may also be provided with suitable parts, such as lugs, so as to be automatically guided by the helical contact groups.

The primary coil is not, in general, formed as shown in the diagrammatic figures of only one, but instead of a larger number of windings. The secondary coil may consist in practice of a single wire or loop. With the secondary coil also, however, each individual limb may be encompassed by a large number of windings. These coils must then be so connected with each other and with the contacts of the contact groups as to fulfill the fundamental requirement, that when two adjacent contacts are short-circuited the short-circuited part of the regulator coil encompasses only one limb or only a part of the cross section of a partial core.

Figure 16:
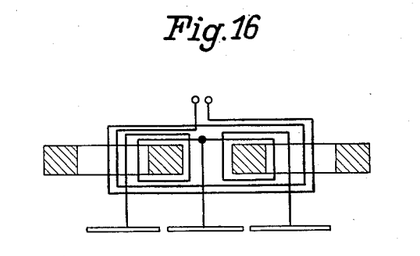
Fig. 16 shows diagrammatically one type of arrangement of the coils on a core section.

Fig. 16 shows diagrammatically the arrangement of the primary and secondary coils in the cases just described.

Figure 17:
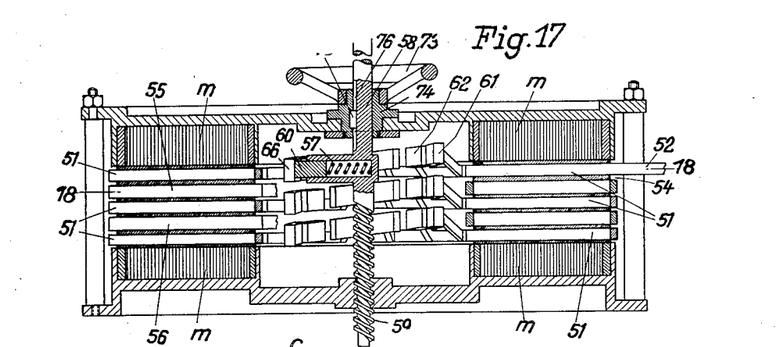
Fig. 17 is a cross section on the line 17—17 of Fig. 18 of a further modification.
Figure 18:
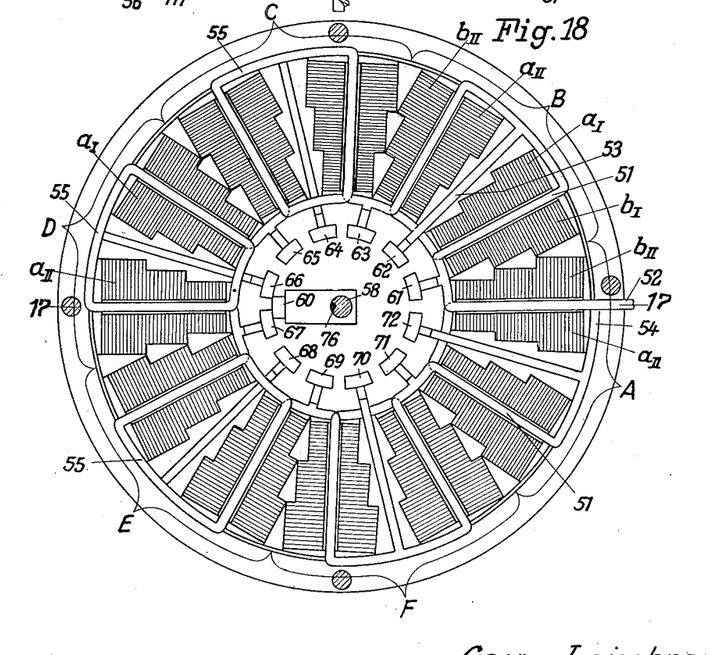
Fig. 18 is a cross section on the line 18—18 of Fig. 17.

Figs. 17 and 18 show a further type of regulating transformer. Fig. 18 is a section so drawn that the left half shows the primary coil, while the right half shows the uppermost winding of the regulator coil, the contact group and the movable contact being shown in plan view for greater clearness. As shown on the figures the core sections may be disposed close together, so that the entire apparatus occupies but little space.

In the regulating transformer shown, the iron core consists of six core sections, A, B, C, D, E, F, each of which consists of a partial core, each partial core consisting of two limbs $a_I$, $a_{II}$ and return conductors $b_I$ and $b_{II}$. Each limb is connected by yokes $m$ with its corresponding return conductor. The core is laminated, that is formed of iron plates which are perpendicular to the plane of Fig. 18. In this form, the portions of the regulator coil within the iron core sections extend radially of the annulus, while the portions outside the core sections extend peripherally thereof. The regulator coil 51 begins at 52 and first passes in a radial direction between limb $a_{II}$ and its return conductor $b_{II}$ of core section A to the interior of the annulus and there connected with the first contact 61 of the contact group. It then passes peripherally to the next core section, and then radially outward between limb $a_I$ and its return conductor $b_I$ of core section B, and then inwardly between limb $a_{II}$ and its return conductor $b_{II}$ of core section B. A tap 53 passes between the limbs $a_I$ and $a_{II}$ to the second contact 62 of the contact path. In corresponding manner the regulator coil extends in a zig-zag path through all the core sections, to the tap connected with contact 72. At 54 the regulator coil bends obliquely downward out of the plane of the previously described windings in order, as shown in Fig. 17, to pass around the core a second and a third time in lower planes.

The primary coil consists of six individual coils, which are connected in parallel. Each of these coils encompasses one partial core, that is the limbs $a_I$ and $a_{II}$ of one of the six core sections. In the regulating transformer shown each of these coils consists of two vertically spaced partial coils 55 and 56, connected in series.

For taking off the current use is made of the brush 60, which is pressed by a spring 57 against the stationary contacts 61, 62, 63, and so on. The brush, during rotation, is raised and lowered by the screw spindle 59 in accordance with the pitch of the contact group. The brush is rotated in any manner, for example, by means of the hand wheel 73 which is mounted on the rotatable part 74, in which shaft 58 of the contact carrying device is slidable. The shaft is carried along to follow the rotation of part 74 by means of a guide key 75 which engages in a groove or slot 76 in the shaft. In the position shown in Fig. 18, the brush connects contacts 66 and 67. The short circuit formed thereby encompasses the limb $a_{II}$ of core section D. Since the corresponding primary coil encompasses the two limbs $a_I$ and $a_{II}$ of core section D, the flux in the limb $a_{II}$ will be suppressed, whereby the flux in the limb $a_I$ is correspondingly increased. The load to be cut out when this short circuit is broken, on further rotation of the brush, is so slight that sparks or arcs practically do not occur.

Figure 19:
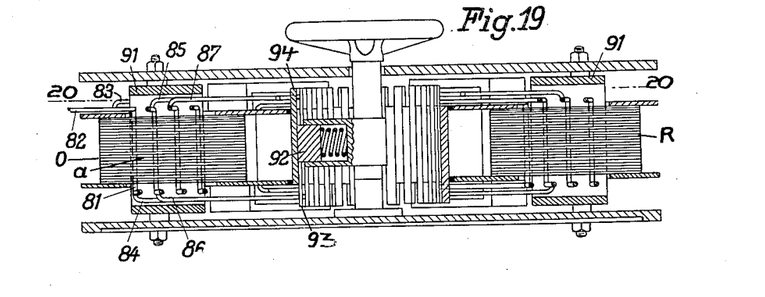
Fig. 19 is a cross section on the line 19—19 of Fig. 20 of a further modification.
Figure 20:
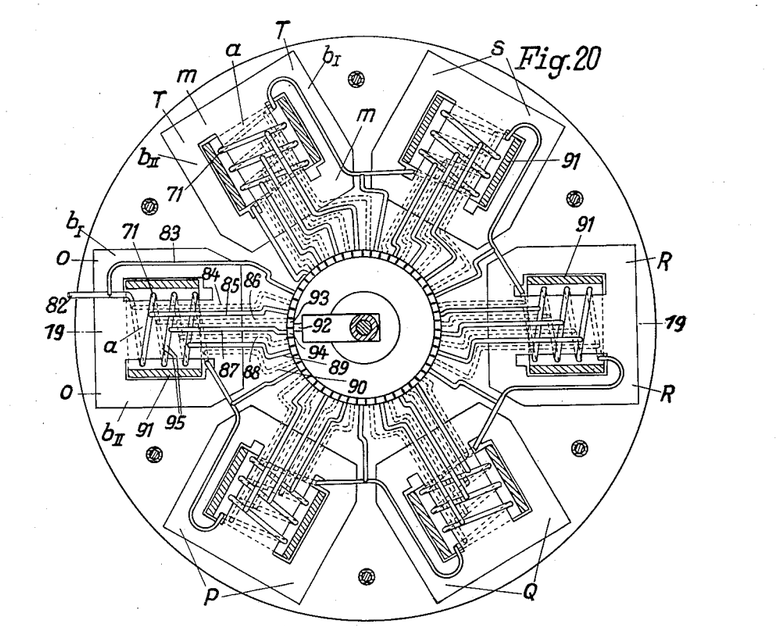
Fig. 20 is a cross section on the line 20—20 of Fig. 19.

Instead of arranging the regulator coil as described, to traverse the core sections radially, an arrangement may also be used in which the regulator coil traverses the core sections in a direction parallel with the axis of the annulus. Figs. 19 and 20 show such an arrangement.

In the regulating transformer of Figs. 19 and 20 the limbs of each partial core are united in one piece, while the return conductors are separated. As in the arrangement of Figs. 17 and 18, the regulating transformer comprises six core sections, O, P, Q, R, S, T, each consisting of a partial core or limb $a$, two return conductors $b_I$ and $b_{II}$, which together have the same iron cross section as the partial core $a$, and two yokes $m$ connecting the partial core and return conductors. The primary windings are indicated generally at 91.

The regulator coil 81 begins at 82. In this modification, the portions of the regulator coil within the core extend parallel to the axis of the annulus, while the portions outside the core extend peripherally thereof. It first passes between partial core $a$ and return conductor $b_I$ of core section O downwardly, in a direction parallel to the axis of the annulus, then peripherally to the opposite side of partial core $a$ and again upwardly between partial core $a$ and return conductor $b_{II}$, and thus winds four times about partial core $a$. Each of such windings is provided at the top and bottom with a tap 83, 84, 85, 86, 87, 88, 89, 90, respectively, these taps being connected to a collector-like contact group. As shown in Fig. 19, each alternate plate 94 of this contact group extends upwardly, and each intermediate plate 93 downwardly, and such plates connect each with the top and bottom taps respectively.

Each partial core $a$ is also encompassed by a primary coil. The six primary coils are connected in parallel. The arrangement of the coils requires that, in contrast to the previously described arrangements, the plates of the laminated iron core must lie parallel with the plane of Fig. 20.

The brush 92 serves for taking off current. If this brush conductively connects two adjacent contact plates, such as 93 and 94 (Fig. 20), the short circuit comprising the taps 86 and 87 and the intermediate part 95 of the regulator coil will encompass only half the cross section of partial core $a$ of core section O, as it encompasses only the magnetic flux circuit through the return conductor $b_{II}$. The flux generated by the primary coil in partial core $a$ is forced from return conductor $b_{II}$ to return conductor $b_I$, so that in this construction also the short circuit current is so small as to prevent injurious phenomena from arising.

It is, of course, understood that in all the arrangements described the direction of the energy may be reversed, and the regulator coils may be connected as primary coils to the source of supply, and the fixed coils as secondary coils to the point of consumption.

I wish it to be understood that I do not desire to be limited to the exact details of the construction shown and described, for obvious modifications will occur to a person skilled in the art.

I claim:

1. Regulating transformer, comprising an iron core, a regulator coil and a group of contacts, said iron core comprising a plurality of partial cores, said regulator coil being so connected with the contacts that when two adjacent contacts are short-circuited the short circuit encompasses only one partial core.

2. Regulating transformer, comprising an iron core, a regulator coil and a group of contacts, said iron core comprising a plurality of annularly disposed partial cores, said regulator coil being so connected with the contacts that when two adjacent contacts are short-circuited the short circuit encompasses only one partial core.

3. A regulating transformer, comprising an iron core, a regulator coil and a group of contacts, said iron core consisting of a plurality of annularly disposed partial cores and magnetic flux return conductors associated therewith, the regulator coil passing in a zig-zag path between the partial cores and the return conductors, and being so connected with the contacts that upon short-circuiting of two adjacent contacts the short circuit encompasses only one partial core.

4. A regulating transformer, comprising an iron core, a regulator coil and a group of contacts, said iron core consisting of a plurality of annularly disposed partial cores and magnetic flux return conductors associated therewith, the regulator coil passing in a zig-zag path between the partial cores and the return conductors, parts of the regulator coil forming the said contacts and being so arranged that upon short-circuiting of two adjacent contacts the short circuit encompasses only one partial core.

5. Regulating transformer, comprising an iron core, a regulator coil and a group of contacts, said iron core comprising a plurality of partial cores, each partial core consisting of a plurality of limbs, said regulator coil being so connected 6. Regulating transformer, comprising an iron core, a regulator coil, taps connected to the regulator coil and to a group of contacts, said iron core comprising a plurality of partial cores, the taps being so connected to the contacts that upon short-circuiting of two adjacent contacts the short circuit encompasses only one partial core.

7. Regulating transformer, comprising an iron core, a regulator coil, taps connected to the regulator coil and to a group of contacts, said iron core consisting of a plurality of annularly arranged partial cores and magnetic flux return conductors associated therewith, each partial core consisting of a plurality of limbs, the regulator coil passing in a zig-zag path between the partial cores and the return conductors, the taps being so connected to the contacts that upon short-circuiting of two adjacent contacts the short circuit encompasses only one limb.

8. Regulating transformer, comprising an iron core, a regulator coil, taps connected to the regulator coil, a group of contacts, said taps being connected to some of said contacts, said iron core consisting of a plurality of annularly arranged partial cores and magnetic flux return conductors associated therewith, each partial core consisting of a plurality of limbs, the regulator coil passing in a zig-zag path between the partial cores and the return conductors, parts of the regulator coil forming the remainder of the contacts of the contact group, the taps being so passed between the limbs of the partial cores that upon short-circuiting of two adjacent contacts the short circuit encompasses only one limb.

9. Regulating transformer, comprising an iron core, a primary coil, a regulator coil and a group of contacts, said iron core comprising a plurality of partial cores the primary coil consisting of a plurality of coils each of which encompasses a plurality of partial cores, said regulator coil being so connected with the contacts that when two adjacent contacts are short-circuited the short circuit encompasses only one partial core.

10. Regulating transformer, comprising an iron core, a primary coil, a regulator coil and a group of contacts, said iron core comprising a plurality of partial cores, the primary coil consisting of a plurality of coils connected in parallel, said regulator coil being so connected with the contacts that when two adjacent contacts are short-circuited the short circuit encompasses only one partial core.

11. Regulating transformer, comprising an iron core, a primary coil, a regulator coil and a group of contacts, said iron core comprising a plurality of partial cores, each partial core consisting of a plurality of limbs, a magnetic flux return conductor associated with each limb, the primary coil consisting of a plurality of coils connected in parallel, each of which encompasses a plurality of limbs, the regulator coil being so connected with the contacts that upon short-circuiting of two adjacent contacts the short circuit encompasses only one limb.

12. Regulating transformer, comprising an iron core, a primary coil, a regulator coil and a group of contacts, said iron core comprising a plurality of annularly disposed partial cores, each partial core consisting of a plurality of limbs, a magnetic flux return conductor associated with each limb, the primary coil consisting of a plurality of coils connected in parallel, each of which encompasses a plurality of limbs, the regulator coil being so connected with the contacts that upon short-circuiting of two adjacent contacts the short circuit encompasses only one limb.

13. Regulating transformer, comprising an iron core, a primary coil, a regulator coil, taps connected to the regulator coil and to a group of contacts, said iron core comprising a plurality of partial cores, each partial core consisting of a plurality of limbs, a magnetic flux return conductor associated with each limb, the primary coil consisting of a plurality of coils connected in parallel, each of which encompasses a plurality of limbs, the taps being so connected to the contacts that upon short-circuiting of two adjacent contacts the short circuit encompasses only one limb.

14. Regulating transformer, comprising an iron core, a primary coil, a regulator coil, taps connected to the regulator coil and to a group of contacts, said iron core comprising a plurality of annularly disposed partial cores each partial core consisting of a plurality of limbs, a magnetic flux return conductor associated with each limb, said return conductors being disposed between the partial cores, the primary coil consisting of a plurality of coils connected in parallel, each encompassing a plurality of limbs, the regulator coil passing in a zig-zag path between the partial cores and the return conductors, the taps being so connected to the contacts that upon short-circuiting of two adjacent contacts the short circuit encompasses only one limb.

15. Regulating transformer, comprising an iron core, a primary coil, a regulator coil, taps connected to the regulator coil and to a group of contacts, said iron core comprising a plurality of annularly disposed partial cores, each partial core consisting of a plurality of limbs, a magnetic flux return conductor associated with each limb, said return conductors being disposed between the partial cores, the primary coil consisting of a plurality of coils connected in parallel, each encompassing the limbs of one partial core, the regulator coil passing in a zig-zag path between the partial cores and the return conductors, the taps being so connected to the contacts that upon short-circuiting of two adjacent contacts the short circuit encompasses only one limb.

16. Regulating transformer, comprising an iron core, a primary coil, a regulator coil, taps connected to the regulator coil and to a group of contacts, said iron core consisting of a plurality of annularly disposed core sections of laminated iron having the laminations perpendicular to the plane of the annulus, each core section consisting of a partial core and magnetic flux return conductors each partial core consisting of a plurality of limbs, each magnetic flux return conductor associated with a limb, said return conductors being disposed between the partial cores, the primary coil consisting of a plurality of coils connected in parallel, each encompassing the limbs of one partial core, the regulator coil passing in a zig-zag path between the partial cores and the return conductors, the portions of the regulator coil outside the iron core sections extending peripherally with respect to the annulus, and the portions within the iron core sections radially with respect to the annulus, the taps being so connected to the contacts that upon short-circuiting of two adjacent contacts the short circuit encompasses only one limb.

17. Regulating transformer, comprising an iron core, a primary coil, a regulator coil, taps connected to the regulator coil and to a group of contacts, said iron core consisting of a plurality of annularly disposed core sections of laminated iron having the laminations parallel to the plane of the annulus, each core section consisting of a partial core and magnetic flux return conductors associated with the partial core, said return conductors being disposed between the partial cores, the primary coil consisting of a plurality of coils connected in parallel, each encompassing a partial core, the regulator coil winding about each partial core passing between the partial core and the return conductors, the portions of said coil within the iron core extending parallel with the axis of the annulus, and the portions outside the core in the direction of the periphery of the annulus, the taps being so connected to the contacts that upon short-circuiting of two adjacent contacts the short circuit encompasses only one of the magnetic flux return conductors.

GEORG LEISCHNER.